(12) United States Patent
Peters et al.

(10) Patent No.: US 9,464,582 B2
(45) Date of Patent: Oct. 11, 2016

(54) SYSTEMS AND METHODS FOR ROUTING EXHAUST

(75) Inventors: Eric David Peters, Lawrence Park, PA (US); Chirag Bipinchandra Parikh, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 113 days.

(21) Appl. No.: 13/557,486

(22) Filed: Jul. 25, 2012

(65) Prior Publication Data

US 2014/0026565 A1    Jan. 30, 2014

(51) Int. Cl.

| | |
|---|---|
| *F02B 33/44* | (2006.01) |
| *F02D 41/00* | (2006.01) |
| *F02D 9/04* | (2006.01) |
| *F02D 23/00* | (2006.01) |
| *F01N 13/10* | (2010.01) |
| *F02B 37/00* | (2006.01) |
| *F02B 37/013* | (2006.01) |
| *F02B 37/02* | (2006.01) |

(Continued)

(52) U.S. Cl.
CPC ......... *F02D 41/0007* (2013.01); *F01N 13/107* (2013.01); *F02B 37/004* (2013.01); *F02B 37/013* (2013.01); *F02B 37/02* (2013.01); *F02B 37/18* (2013.01); *F02D 9/04* (2013.01); *F02D 23/00* (2013.01); *F02D 41/005* (2013.01); *F02D 41/0065* (2013.01); *F02D 41/0082* (2013.01); *F02M 26/43* (2016.02); *F01N 2240/36* (2013.01); *F01N 2590/08* (2013.01); *F02B 29/0412* (2013.01); *F02B 37/025* (2013.01); *Y02T 10/144* (2013.01); *Y02T 10/47* (2013.01)

(58) Field of Classification Search
CPC ... Y02T 10/144; Y02T 10/47; Y02T 10/121; F02B 37/007; F02B 37/013; F02B 37/025; F02B 37/18; F02M 25/0711

USPC .............. 60/273, 612; 123/481, 562, 568.12
See application file for complete search history.

(56) References Cited

U.S. PATENT DOCUMENTS

| | | |
|---|---|---|
| 5,974,801 A | 11/1999 | Houtz |
| 6,360,541 B2 | 3/2002 | Waszkiewicz |
| 6,658,848 B1 | 12/2003 | Pierpont |

(Continued)

FOREIGN PATENT DOCUMENTS

| | | | |
|---|---|---|---|
| CN | 1263948 C | | 7/2006 |
| DE | 102005002246 | * | 7/2006 |

(Continued)

OTHER PUBLICATIONS

Search Report and Written Opinion from corresponding PCT Application No. PCT/US2013/047499 dated Sep. 13, 2013.

(Continued)

*Primary Examiner* — Thomas Denion
*Assistant Examiner* — Thomas Olszewski
(74) *Attorney, Agent, or Firm* — GE Global Patent Operation

(57) ABSTRACT

Various systems and methods are provided for routing exhaust from an engine. In one example, a system includes a high pressure turbine and a low pressure turbine. The system further includes a first passage for routing exhaust from a first subset of cylinders, bypassing the high pressure turbine, to upstream of the low pressure turbine in an exhaust passage of the engine, and a second passage for routing exhaust from a second, different, subset of cylinders to upstream of the high pressure turbine.

20 Claims, 15 Drawing Sheets

(51) Int. Cl.
*F02B 37/18* (2006.01)
*F02B 29/04* (2006.01)

(56) References Cited

U.S. PATENT DOCUMENTS

| | | | |
|---|---|---|---|
| 7,540,150 B2* | 6/2009 | Schmid et al. | 60/612 |
| 8,418,680 B2* | 4/2013 | Zitzler et al. | 123/568.12 |
| 2002/0073981 A1 | 6/2002 | Coleman et al. | |
| 2006/0021347 A1 | 2/2006 | Sun et al. | |
| 2007/0033936 A1 | 2/2007 | Panciroli | |

FOREIGN PATENT DOCUMENTS

| | | |
|---|---|---|
| DE | 102005002246 A1 | 7/2006 |
| WO | 2004031552 A2 | 4/2004 |

OTHER PUBLICATIONS

Office Action from corresponding CN Application No. 201380039449.2 dated Jun. 1, 2016.

* cited by examiner

US 9,464,582 B2

SYSTEMS AND METHODS FOR ROUTING EXHAUST

FIELD

Embodiments of the subject matter disclosed herein relate to routing exhaust from an engine in an engine system.

BACKGROUND

Engines may utilize recirculation of exhaust gas from an engine exhaust system to an engine intake system, a process referred to as exhaust gas recirculation (EGR), to reduce regulated emissions. In some examples, a group of one or more cylinders may have an exhaust manifold that is selectively coupled to an intake passage of the engine such that the group of cylinders is dedicated, at least under some conditions, to generating exhaust for EGR. Such cylinders may be referred to as "donor cylinders." Further, some EGR systems may include multiple valves to direct exhaust from the donor cylinders to an intake passage and/or an exhaust passage based on a desired amount of EGR.

In one example, exhaust from the donor cylinders may be directed to the exhaust passage upstream of a high pressure turbine of a high pressure turbocharger (e.g., the high pressure turbine may be in series upstream from a turbine of a second turbocharger that operates at a relatively lower pressure). Under some conditions, it may be desirable for the exhaust to bypass the high pressure turbine, and as such, the exhaust system further includes a high pressure turbine bypass with a wastegate. In such an example, however, a relatively large amount of space is needed to accommodate the various exhaust gas passages, bypasses, valves, etc. and packaging space may be limited.

BRIEF DESCRIPTION

Thus, in one embodiment, a system comprises a high pressure turbine and a low pressure turbine. The system further comprises a first passage for routing exhaust from a first subset of cylinders, bypassing the high pressure turbine, to upstream of the low pressure turbine in an exhaust passage of an engine, and a second passage for routing exhaust from a second, different, subset of cylinders to upstream of the high pressure turbine.

In such a configuration, exhaust from the first subset of cylinders is routed directly from the first subset of cylinders to a location downstream of the high pressure turbine in the exhaust passage. As such, exhaust from the first subset of cylinders does not mix with exhaust from the second subset of cylinders upstream of the high pressure turbocharger. By directing the exhaust from the first subset of cylinders directly to downstream of the high pressure turbine, a turbocharger bypass and bypass valve may be eliminated, thereby reducing a size of the system and an amount of packaging space required for the system. Further, because the exhaust from the first subset of cylinders is routed around the high pressure turbine, a pressure pulsation on the second passage and the high pressure turbine may be reduced.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for routing exhaust from an engine. In one example, a system comprises a high pressure turbine, a low pressure turbine, and a first passage for routing exhaust from a first subset of cylinders, bypassing the high pressure turbine, to upstream of the low pressure turbine in an exhaust passage of the engine. The system further comprises a second passage for routing exhaust from a second, different, subset of cylinders to upstream of the high pressure turbine. By routing exhaust from the first subset of cylinders to a location downstream of the high pressure turbine, the exhaust from the first subset of cylinders does not mix with exhaust from the second subset of cylinders upstream of the high pressure turbine. In this manner, pressure pulsations on the high pressure turbine and the second passage may be reduced, thereby decreasing wear on the second passage and the high pressure turbine. Further, because the exhaust from the first subset of cylinders is routed directly to a location downstream of the high pressure turbine, a high pressure turbine bypass and bypass valve may be removed from the system. In this way, a size of the system may be reduced resulting in less packaging space required to accommodate the system.

In one embodiment, the first and second passages may be part of an exhaust system coupled to an engine in a vehicle. In some embodiments, a locomotive system may be used to exemplify one of the types of vehicles having engines to which the exhaust system may be attached. Other types of vehicles may include on-highway vehicles and off-highway vehicles other than locomotives or other rail vehicles, such as mining equipment and marine vessels. Other embodiments of the invention may be used for exhaust systems that are coupled to stationary engines. The engine may be a diesel engine, or may combust another fuel or combination of fuels. Such alternative fuels or combinations of fuels may include gasoline, kerosene, biodiesel, natural gas, and/or ethanol. Suitable engines may use compression ignition and/or spark ignition.

Figure 1:
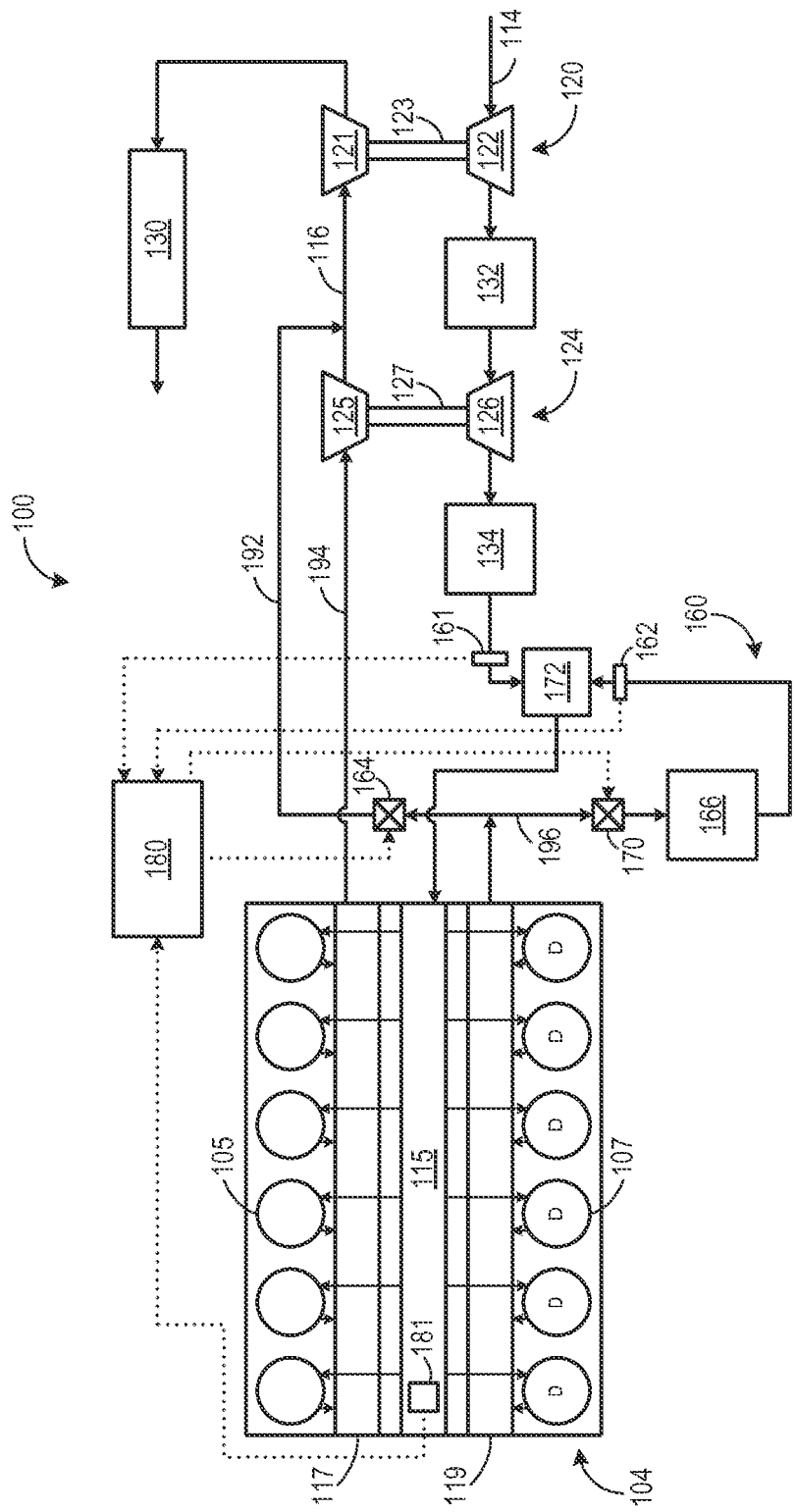
FIG. 1 shows a schematic diagram of an engine with an exhaust gas recirculation system.

FIG. 1 shows a block diagram of an exemplary embodiment of an engine system 100 with an engine 104, such as an internal combustion engine.

The engine 104 receives intake air for combustion from an intake, such as an intake manifold 115. The intake may be any suitable conduit or conduits through which gases flow to enter the engine. For example, the intake may include the intake manifold 115, an intake passage 114, and the like. The intake passage 114 receives ambient air from an air filter (not shown) that filters air from outside of a vehicle in which the engine 104 may be positioned. Exhaust gas resulting from combustion in the engine 104 is supplied to an exhaust, such as exhaust passage 116. The exhaust may be any suitable conduit through which gases flow from the engine. For example, the exhaust may include an exhaust manifold 117, the exhaust passage 116, first passage 192, second passage 194, third passage 196, and the like. Exhaust gas flows through the exhaust passage 116.

In the exemplary embodiment depicted in FIG. 1, the engine 104 is a V-12 engine having twelve cylinders. In other examples, the engine may be a V-6, V-8, V-10, V-16, I-4, I-6, I-8, opposed 4, or another engine type. As depicted, the engine 104 includes a first subset of donor cylinders 107, which includes six cylinders that supply exhaust gas exclusively to a donor cylinder exhaust manifold 119, and a second, different, subset of non-donor cylinders 105, which includes six cylinders that supply exhaust gas exclusively to a non-donor cylinder exhaust manifold 117. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired number of donor cylinders and non-donor cylinders, with the number of donor cylinders typically lower than the number of non-donor cylinders.

As depicted in FIG. 1, the first subset of cylinders (e.g., the donor cylinders 107), may provide exhaust gas to each of the intake passage 114 and the exhaust passage 116 downstream of a high pressure turbine 125 of a high pressure turbocharger 124. In the embodiment depicted in FIG. 1, all of the exhaust gas from the donor cylinders 107 is supplied to the intake passage 114, the exhaust passage 116 downstream of the high pressure turbine 125, or a combination of the intake passage 114 and the exhaust passage 116 downstream of the high pressure turbine 125. A first passage 192 is provided for routing exhaust from the donor cylinders 107 to a location downstream of the high pressure turbine 125 and upstream of a low pressure turbine 121 of a low pressure turbocharger 120, such that the exhaust gas from the donor cylinders 107 bypasses the high pressure turbine 125. The first passage 192 does not route exhaust gas from the donor cylinders 107 to a location upstream of the high pressure turbine 125 and does not route exhaust gas from the donor cylinders 107 to a location downstream of the low pressure turbine 121. In this manner, exhaust gas from the donor cylinders 107 mixes with exhaust exiting the high pressure turbine 125. When the exhaust gas from the donor cylinders 107 mixes with exhaust gas from the non-donor cylinders 105 downstream of the high pressure turbine 125 instead of upstream of the high pressure turbine 125, for example, pressure pulsations on the turbocharger 124 and the exhaust passage 116 may be reduced. For example, the frequency of pressure pulses may decrease by half, as only six cylinders are supplying exhaust gas to upstream of the high pressure turbine 125 instead of twelve cylinders.

A second passage 194 is provided for routing all exhaust gas from the second, different subset of cylinders (e.g., the non-donor cylinders 105) to upstream of the high pressure turbine 125. In this way, all the exhaust gas from the non-donor cylinders passes through the high pressure turbine 125 and the low pressure turbine 121.

A third passage 196 is provided for routing exhaust from the donor cylinders 107 to the intake passage 114. In the example shown in FIG. 1, the exhaust gas is routed to an exhaust gas recirculation (EGR) mixer 172 positioned downstream of an EGR cooler 166. As such, exhaust gas from the donor cylinders 107 is routed downstream of a high pressure compressor 126 of the high pressure turbocharger 124 and a low pressure compressor 122 of the low pressure turbocharger 120. The exhaust gas from the donor cylinders 107 is not routed to a location upstream of the high pressure compressor 126 and is not routed to a location upstream of the low pressure compressor 122. In this way, the donor cylinders 107 provide high pressure EGR, and the engine system 100 includes a high pressure EGR system 160. Thus, the third passage 196 may be an EGR passage, for example, which provides EGR to the engine 104. In the exemplary embodiment shown in FIG. 1, exhaust gas flowing through the third passage 196 passes through a heat exchanger such as an EGR cooler 166 to reduce a temperature of (e.g., cool) the exhaust gas before the exhaust gas returns to the intake passage 114. The EGR cooler 166 may be an air-to-liquid heat exchanger, for example.

Further, in such an example, one or more charge air coolers (e.g., intercooler 132 and aftercooler 134) disposed in the intake passage 114 (e.g., upstream of where the recirculated exhaust gas enters) may be adjusted to further increase cooling of the charge air such that a mixture temperature of charge air and exhaust gas is maintained at a desired temperature. By introducing cooled exhaust gas to the engine 104, the amount of available oxygen for combustion is decreased, thereby reducing combustion flame temperatures and reducing the formation of nitrogen oxides (e.g., $NO_x$).

As shown in FIG. 1, the engine system 100 further includes the EGR mixer 172 which mixes the recirculated exhaust gas with charge air such that the exhaust gas may be evenly distributed within the charge air and exhaust gas mixture. In the exemplary embodiment depicted in FIG. 1, the EGR system 160 is a high pressure EGR system which routes exhaust gas from the donor cylinders 107 to a location downstream of the compressors 122 and 126 in the intake passage 114. In other embodiments, the engine system 100 may additionally or alternatively include a low pressure EGR system in which exhaust is routed from downstream of the low-pressure turbine 121 to upstream of the low pressure compressor (e.g., the exhaust has a lower pressure when it enters the intake passage 114 in the low pressure exhaust system than in the high pressure exhaust system, as the exhaust has passed through the high pressure and low pressure turbines 125, 121).

In the exemplary embodiment shown in FIG. 1, the engine system 100 further includes a first control element 164 disposed in the first passage 192 and a second control element disposed in the third passage 196 to control exhaust flow through the first passage 192 and the second passage 194. The first control element 164 and the second control element 170 may be on/off valves controlled by a control system 180 (for turning the flow of EGR on or off), or they may control a variable amount of EGR, for example. In the exemplary embodiment shown in FIG. 1, the first control element 164 and the second control element 170 may be engine oil, or hydraulically actuated valves, for example, with a shuttle valve (not shown) to modulate the engine oil. In some examples, the control elements may be actuated such that one of the first and second control elements 164 and 170 is normally open and the other is normally closed. In other examples, the first and second control elements 164 and 170 may be pneumatic valves, electric valves, or another suitable valve.

In such a configuration, the first control element 164 is operable to route exhaust from the donor cylinders 107 to the exhaust passage 116 of the engine 104 downstream of the high pressure turbine 125 and the second control element 170 is operable to route exhaust from the donor cylinders 107 to the intake passage 114 of the engine 104. In some examples, the first control element 164 may be actuated such that an EGR amount is reduced (e.g., a greater amount of exhaust gas flows from the donor cylinder exhaust manifold 117 to the exhaust passage 116 downstream of the high pressure turbine 125 and upstream of the low pressure turbine 121). In other examples, the first control element 164 may be actuated such that the EGR amount is increased (e.g., a greater amount of exhaust gas flows from the donor cylinder exhaust manifold 119 to the intake passage 114).

In some embodiments, the first and second control elements 164 and 170 may be controlled based on information of a first pressure and information of a second pressure obtained from first and second pressure sensors 161 and 162 disposed downstream of the aftercooler 134 in the intake passage 114 and upstream of the EGR mixer in the third passage 196, respectively. The first control element 164 and the second control element 170 are operable to selectively route portions of the exhaust to one or more of the intake passage 114 and the exhaust passage 116 based on the first and second pressures. As one example, if the first pressure is greater than the second pressure, the first control element 164 may be opened to route exhaust through the first passage 192 and the second control element 170 may be closed to reduce a flow of exhaust gas through the third passage 196. In this way, charge air may be prevented from entering the third passage 196 when the first pressure in the intake passage 114 is greater than the second pressure in the third passage 196, for example.

As depicted in FIG. 1, the engine system 100 further includes a two-stage turbocharger with the low pressure turbocharger 120 and the high pressure turbocharger 124 arranged in series, each of the turbochargers 120 and 124 arranged between the intake passage 114 and the exhaust passage 116. The two-stage turbocharger increases air charge of ambient air drawn into the intake passage 114 in order to provide greater charge density during combustion to increase power output and/or engine-operating efficiency. The low pressure turbocharger 120 operates at a relatively lower pressure, and includes a low pressure turbine 121 which drives the low pressure compressor 122. The low pressure turbine 121 and the low pressure compressor 122 are mechanically coupled via a low pressure turbocharger shaft 123. The high pressure turbocharger 124 operates at a relatively higher pressure than the low pressure turbocharger 120, and includes the high pressure turbine 125 which drives the high pressure compressor 126. The high pressure turbine 125 and the high pressure compressor 122 are mechanically coupled via a high pressure turbocharger shaft 127. As depicted, the low pressure turbine 121 is fluidly coupled downstream of the high pressure turbine 125 in the exhaust passage 116, and the low pressure compressor 122 is fluidly coupled upstream of the high pressure compressor 126 in the intake passage 114.

The engine system 100 further includes an aftertreatment system 130 coupled in the exhaust passage in order to reduce regulated emissions. As depicted in FIG. 1, the aftertreatment system 130 is disposed downstream of the low pressure turbine 121. In other embodiments, an exhaust gas treatment system may be additionally or alternatively disposed upstream of the low pressure turbine 121. The aftertreatment system 130 may include one or more components. For example, the aftertreatment system 130 may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof.

The engine system 100 further includes the control system 180, which is provided and configured to control various components related to the engine system 100. In one example, the control system 180 includes a computer control system. The control system 180 further includes non-transitory, computer readable storage media (not shown) including code for enabling on-board monitoring and control of engine operation. The control system 180, while overseeing control and management of the engine system 100, may be configured to receive signals from a variety of engine sensors, as further elaborated herein, in order to determine operating parameters and operating conditions, and correspondingly adjust various engine actuators to control operation of the engine system 100. For example, the control system 180 may receive signals from various engine sensors including, but not limited to, engine speed, engine load, boost pressure, ambient pressure, exhaust temperature, exhaust pressure, etc. Correspondingly, the control system 180 may control the engine system 100 by sending commands to various components such as traction motors, alternator, cylinder valves, throttle, heat exchangers, wastegates or other valves or flow control elements, etc.

As another example, the control system 180 may receive signals from various pressure sensors disposed in various locations throughout the engine system. For example, the control system may receive signals from the first pressure sensor 161 positioned upstream of the EGR mixer 172 in the intake passage 114 and the second pressure sensor 162 positioned upstream of the EGR mixer 172 in the third passage 196. Based on the signals received indicating the first and second pressures, for example, one or both of the first control element 164 and the second control element 170 may be adjusted such that a desired exhaust gas flow into the intake passage 114 is achieved. In other examples, the first control element 164 and the second control element 170 may be adjusted to adjust an amount of exhaust gas flowing through the EGR cooler to meet emissions targets or to route a desired amount of exhaust to the exhaust passage 116 downstream of the high pressure turbine 125.

Figure 2:
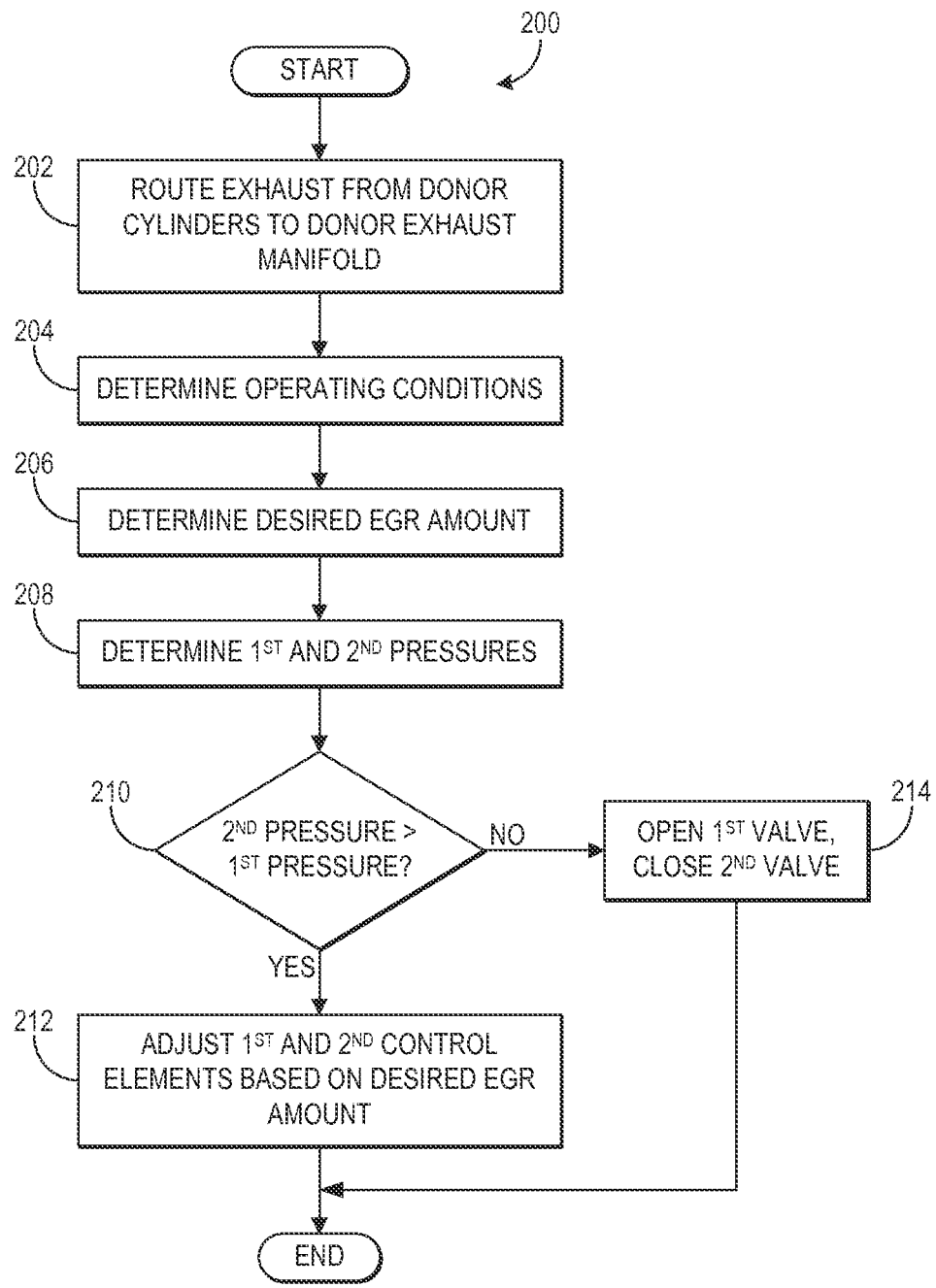
FIG. 2 shows a flow chart illustrating a method for adjusting first and second valves in an exhaust system.

An embodiment relates to a method. The method comprises selectively routing exhaust from a first subset of engine cylinders to each of an intake passage and an exhaust passage downstream of a high pressure turbine and upstream of a low pressure turbine. The method further comprises varying an amount of the exhaust routed to the exhaust passage, and varying an amount of the exhaust routed to the intake passage. An example of another embodiment of a method is illustrated in the flow chart of FIG. 2. FIG. 2 shows a flow chart illustrating a method 200 for an engine system with donor cylinders which route exhaust to each of an intake passage and an exhaust passage downstream of a high pressure turbine, such as the engine system 100 described above with reference to FIG. 1. Specifically, the method shown in FIG. 2 determines a desired amount of exhaust gas recirculation and adjusts first and second control elements based on the desired amount of EGR and pressures measured at charge air coming out from an aftercooler (e.g., the aftercooler 134 shown in FIG. 1) in an intake passage and in an EGR passage (e.g., the third passage 196 shown in FIG. 1).

At step 202, exhaust gas is routed from donor cylinders of an engine to a donor cylinder manifold. At step 204, operating conditions are determined. Nonlimiting examples of the operating conditions may include exhaust gas temperature, ambient temperature, ambient pressure, engine load, or the like.

At step 206, the desired amount of EGR is determined. The desired amount of EGR may be based on the operating conditions, for example. As one example, the desired amount of EGR may be determined based on an amount of regulated emissions from the engine, such as an amount of $NO_x$. Once the desired amount of EGR is determined, a first pressure in the intake passage is determined and a second pressure in the third passage (e.g., the EGR passage) is determined at step 208. Information of the first and second pressures may be obtained from a first pressure sensor and a second pressure sensor, respectively, for example.

At step 210, it is determined if the second pressure is greater than the first pressure. If it is determined that the second pressure is less than the first pressure, the method moves to step 214 where the first control element is opened and the second control element is closed. In this manner, exhaust gas from the donor cylinders is directed to a first passage and not to the third passage, such that the exhaust is routed to downstream of the high pressure turbine in the exhaust passage. By closing the second control element, a chance that charge air may flow into the exhaust system due to the higher pressure in the intake passage than in the third passage is reduced, for example.

On the other hand, if it is determined that the second pressure is greater than the first pressure, the method continues to step 212. At step 212, the first and second control elements are adjusted based on the desired amount of EGR. For example, if an increased amount of EGR is desired, the first control element may be adjusted to be more closed (e.g., less flow through the first control element) and the second control element may be adjusted to be more open (e.g., more flow through the second control element). As another example, if a decreased amount of EGR is desired, the first control element may be adjusted to be more open and the second control element may be adjusted to be more closed. In one example, if no EGR is desired, the first valve is opened and the second valve is closed such that substantially all of the exhaust from the donor cylinders is directed through the first passage to downstream of the high pressure turbine in the exhaust passage.

Thus, the first and second control elements may be adjusted to vary the amount of exhaust gas from the donor cylinders entering the intake passage and the exhaust passage downstream of the high pressure turbine. The first and second control elements may be further adjusted based on first and second pressures measured in the intake passage and the EGR passage, respectively. For example, in order to prevent intake air from entering the EGR system, the second control element may be closed when the first pressure is greater than the second pressure. As long as the first pressure is less than the second pressure, the first and second control elements may be adjusted to achieve a desired amount of EGR.

Figure 3:
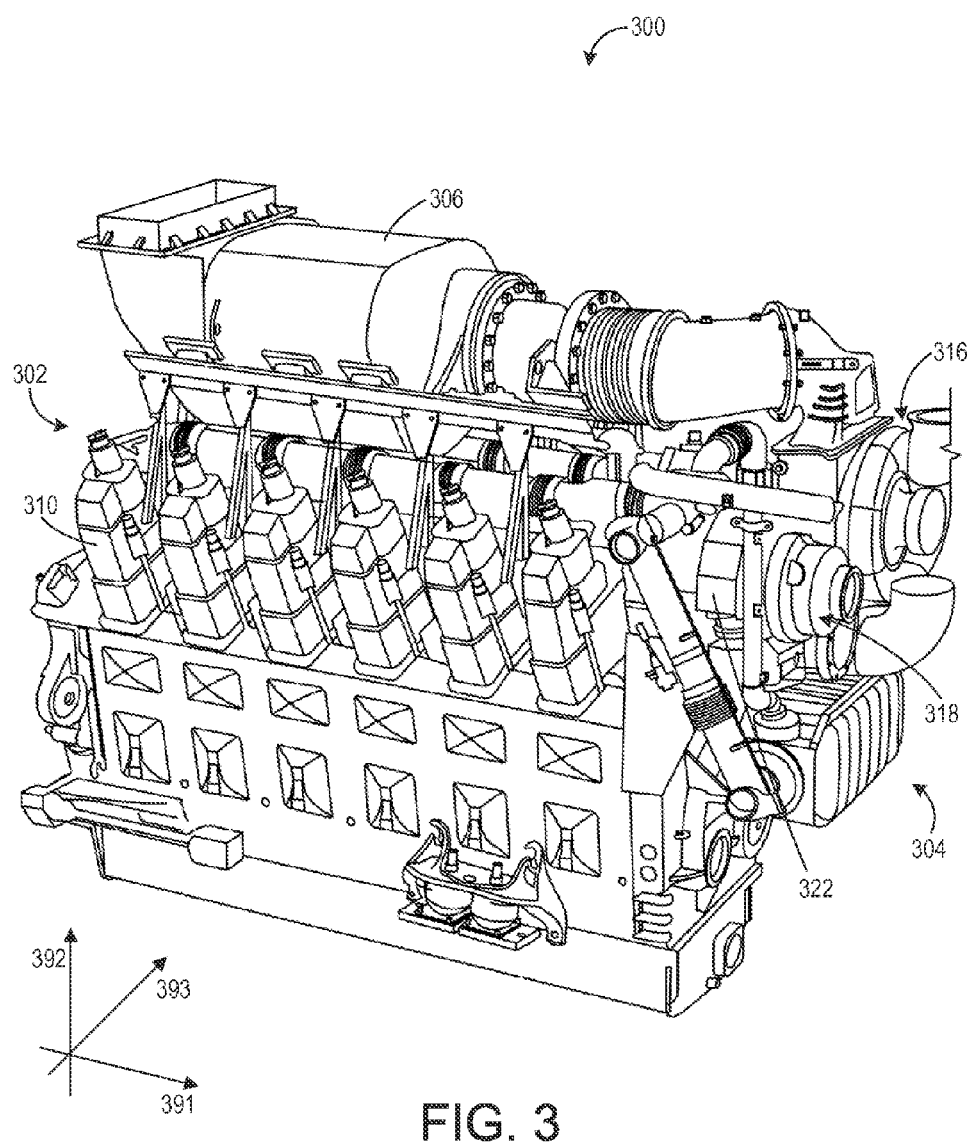
FIGS. 3-8 show perspective views, approximately to scale, of an engine system in which exhaust is routed to upstream or downstream of a high pressure turbine from a first subset of cylinders.
Figure 4:
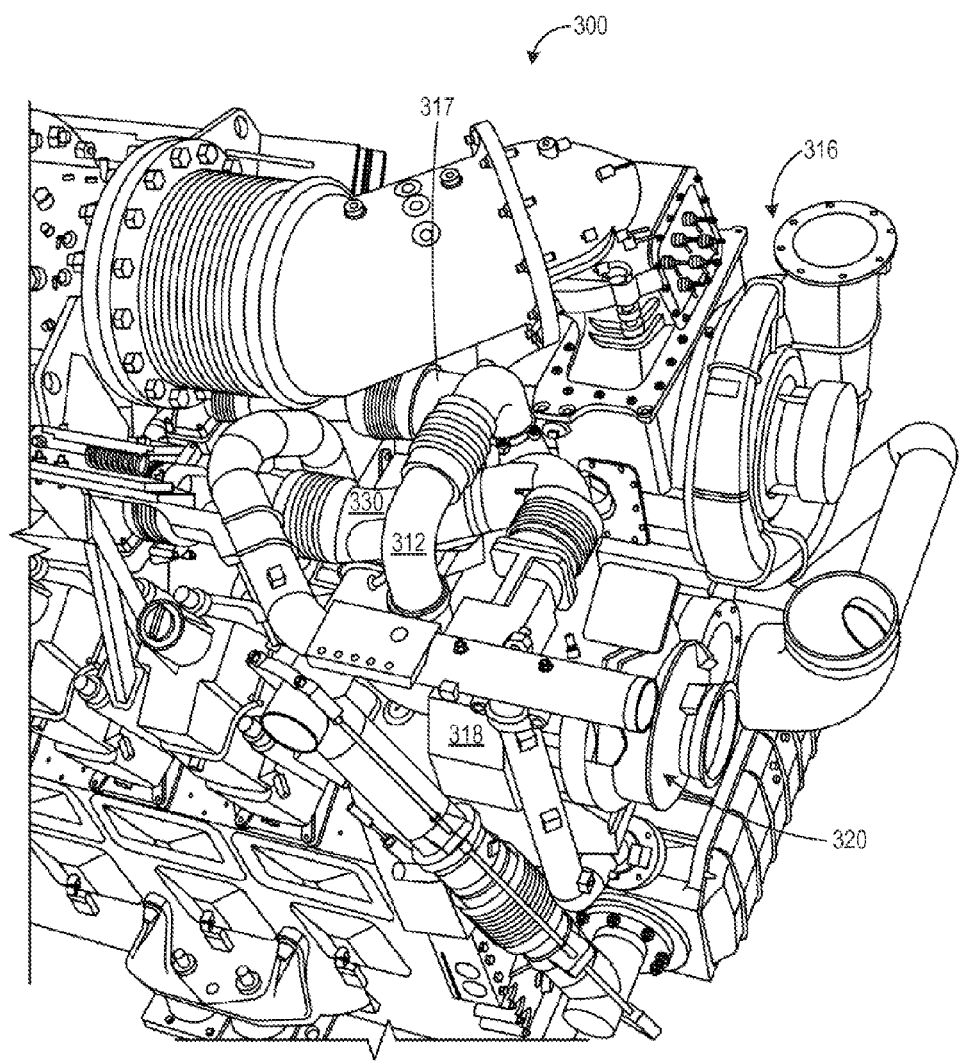
Figure 5:
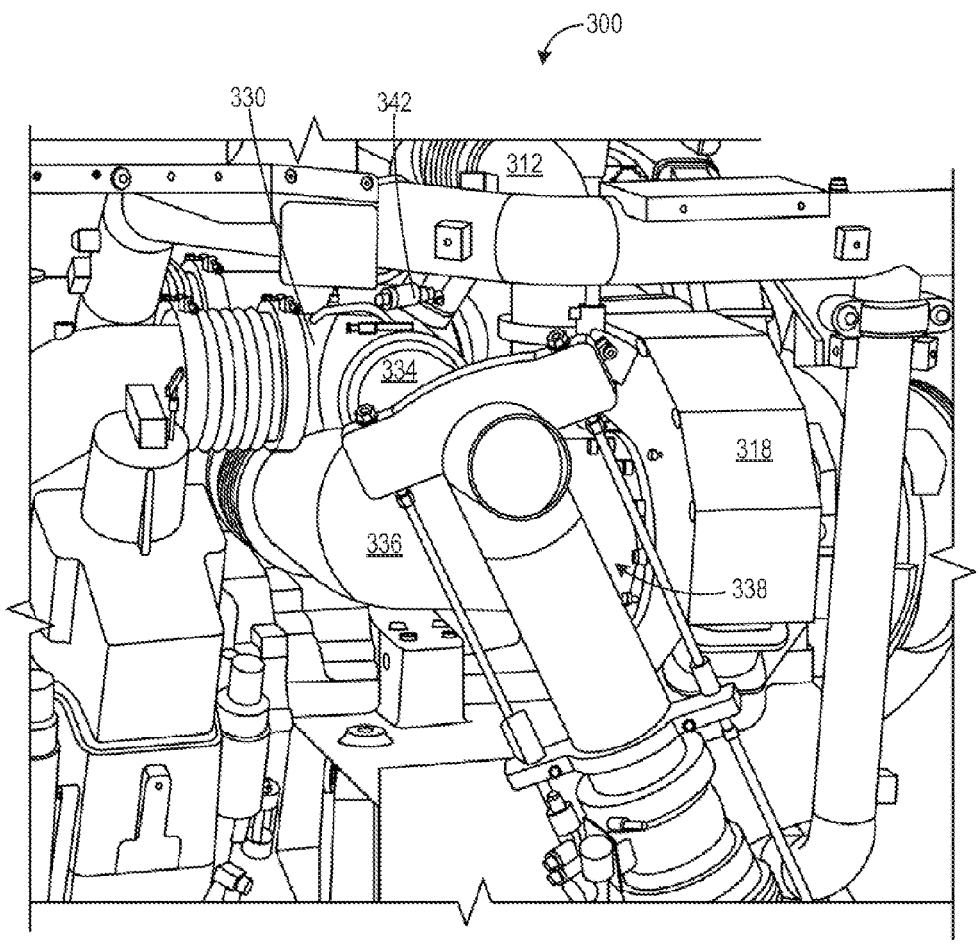
Figure 6:
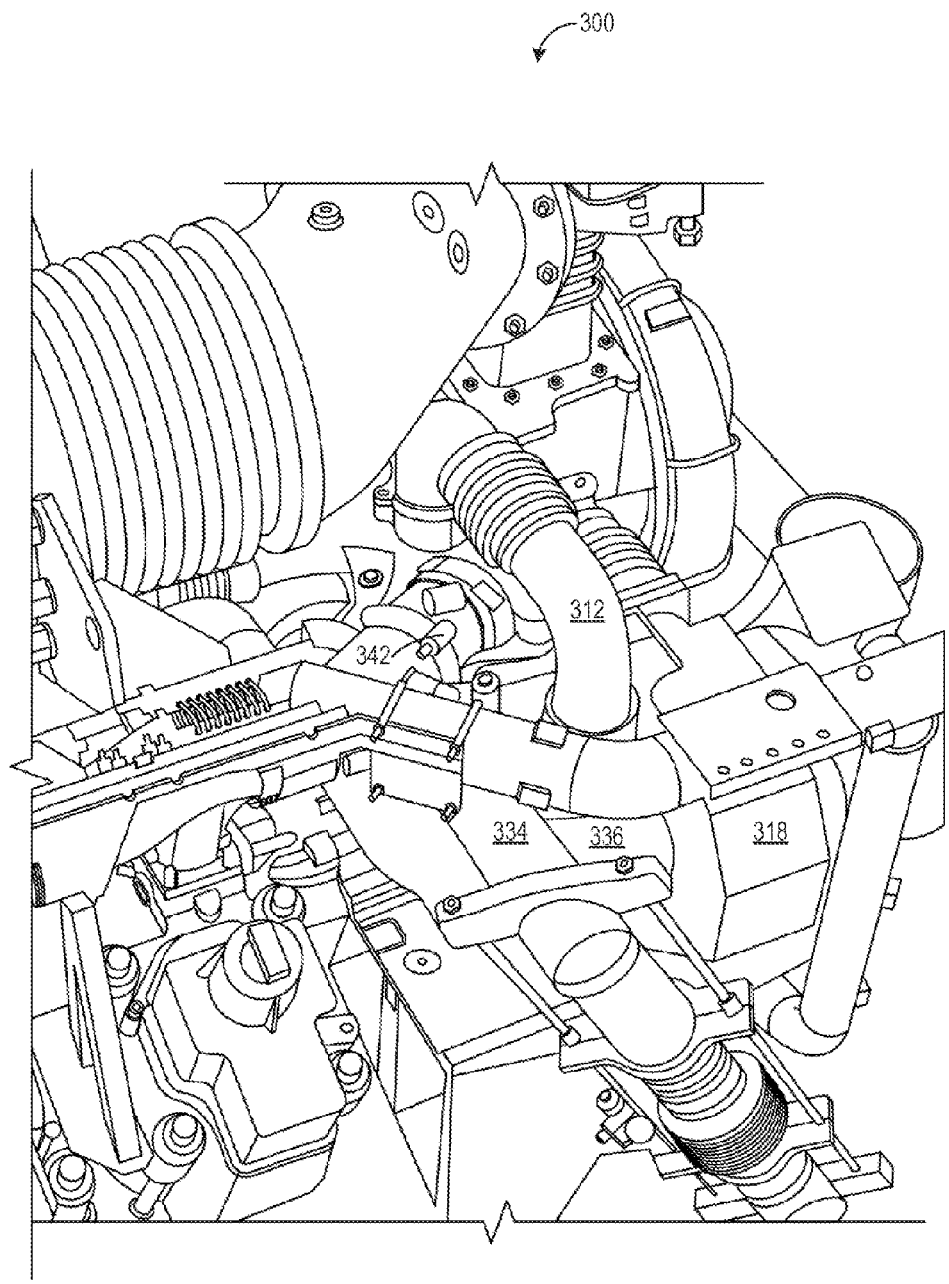
Figure 7:
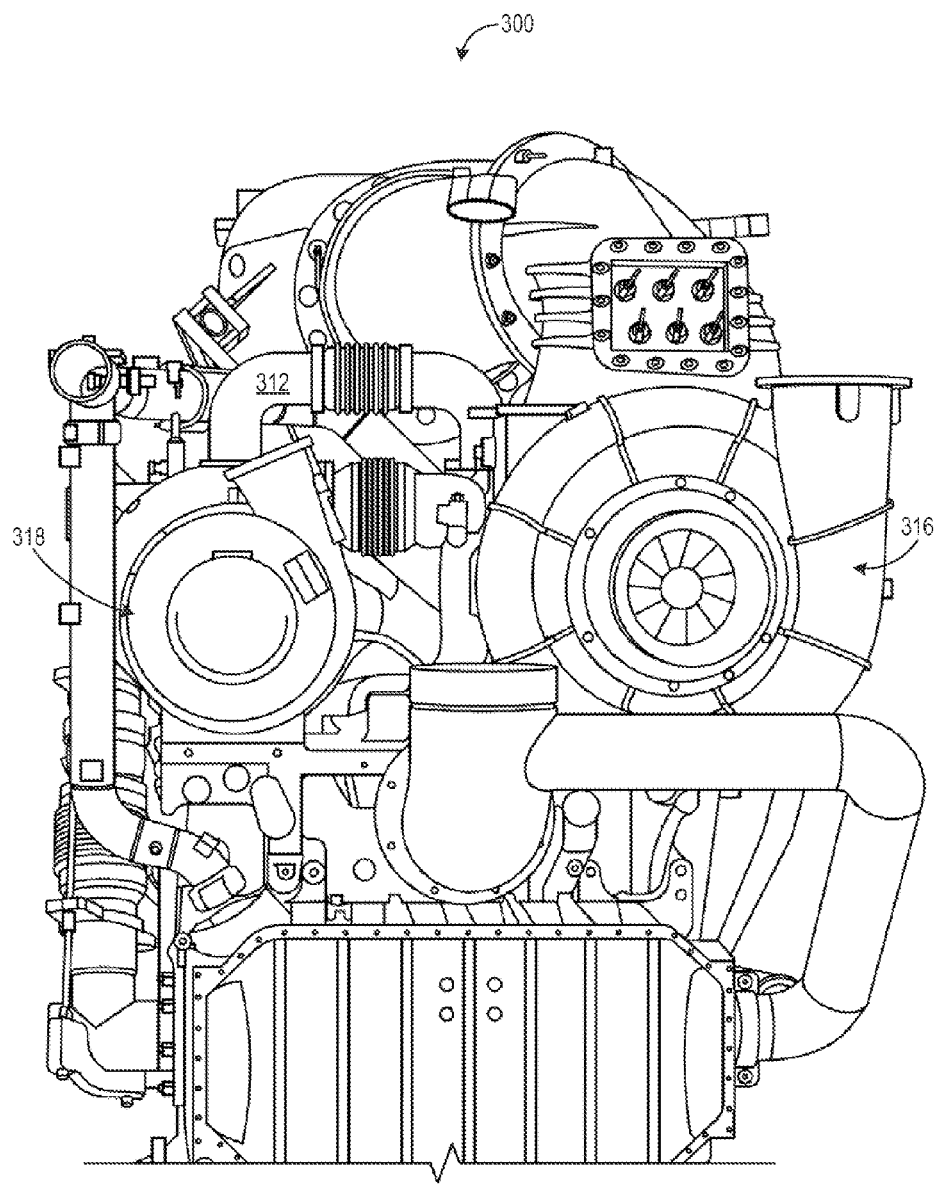
Figure 8:
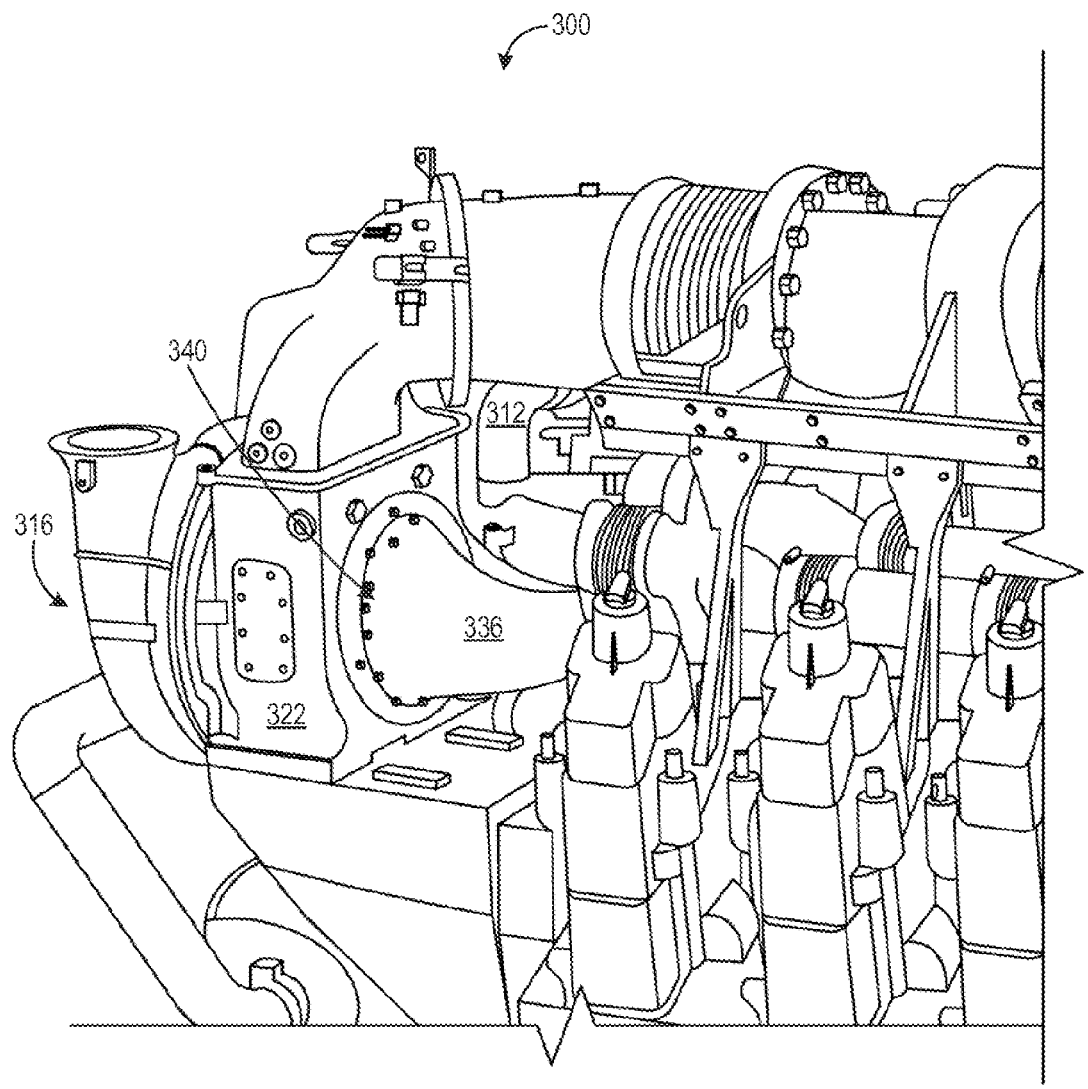

FIGS. 3-8 show perspective views of an engine system 300 which includes a high-pressure turbine bypass 312 with a bypass valve 314. The perspective views illustrated in FIGS. 3-8 are shown approximately to scale. FIG. 3 shows a view of the engine system 300 including an engine 302, an exhaust system, and an aftertreatment system 306. In the view illustrated in FIG. 3, a front 304 of the engine 302 is facing toward a right side of the page and a first subset of cylinders 310 (e.g., donor cylinders) is shown.

As depicted, the engine 302 is a V-engine which includes two banks of cylinders that are positioned at an angle of less than 180 degrees with respect to one another such that they have a V-shaped inboard region and appear as a V when viewed along a longitudinal axis of the engine. The longitudinal axis of the engine is defined by its longest dimension in this example. In the example of FIGS. 3-8, the longitudinal direction is indicated by 391, the vertical direction is indicated by 392, and the lateral direction is indicated by 393. A second bank of cylinders 308, which is not shown in FIG. 3, may be the second subset of cylinders 105 described above with reference to FIG. 1, and the bank of cylinders 310 shown in FIG. 3 may be the first subset of cylinders 107 (e.g., donor cylinders) described above.

Each bank of cylinders includes a plurality of cylinders (e.g., six cylinders in FIGS. 3-8). Each of the plurality of cylinders includes an intake valve which is controlled by a camshaft to allow a flow of compressed intake air to enter the cylinder for combustion. In the examples shown in FIGS. 3-8, charge air enters an intake manifold flowing in the longitudinal direction from the front 304 of the engine 302 toward the back of the engine 302. Each of the cylinders further includes an exhaust valve which is controlled by the camshaft to allow a flow of combusted gases (e.g., exhaust gas) to exit the cylinder. In the examples of FIG. 3-8, the exhaust gas exits the cylinder, enters an exhaust manifold positioned within the V (e.g., in an inboard orientation), and then flows in the longitudinal direction to an exhaust system toward the front 304 of the engine. In other embodiments, the exhaust manifold may be in an outboard orientation, for example, in which the exhaust manifold is positioned outside of the V.

In the exemplary embodiment shown in FIGS. 3-8, an aftertreatment system 306 is positioned vertically above the engine 302. The aftertreatment system 306 is positioned on top of the engine 302 such that it fits within a space defined by a top surface of an exhaust manifold of the engine 302, a roof assembly of an engine cab (not shown), and side walls of the engine cab. As depicted in FIG. 3, a longitudinal axis of the aftertreatment system 306 is aligned in parallel with the longitudinal axis of the engine 302. This configuration provides for desirable space utilization, for example.

The engine system 300 further includes a low pressure turbocharger 316 and a high pressure turbocharger 318 mounted adjacent each other in the lateral direction on the front 304 of the engine 302. In the examples shown in FIGS. 3-8, exhaust from each bank of cylinders may enter a second exhaust passage 317 such that the exhaust from each bank of cylinders passes through a high pressure turbine 320 of the high pressure turbocharger 318 and then through a low pressure turbine 322 of the low pressure turbocharger 316. Exhaust from the first subset of cylinders 310 (e.g., the bank of cylinders shown in FIG. 3) may be routed through the high pressure turbine bypass 312 by adjusting the bypass valve 314 (e.g., wastegate). As such, exhaust from the first subset of cylinders 310 may mix with exhaust from the second subset of cylinders 308 (e.g., the bank of cylinders not shown in FIG. 3) and/or may be directed to downstream of the high pressure turbine 320 based on a position of the bypass valve 314.

In particular, exhaust flows from the first subset of cylinders 310 to a first passage 330. Based on a position of a low control valve 342, exhaust from the first subset of cylinders 310 may flow to an inlet 332 of the high pressure turbine 320 and/or to an intake passage via an EGR passage 334. The exhaust from the first subset of cylinders 310 that flows to the high pressure turbine 320 mixes with exhaust from the second subset of cylinders 308 upstream of the inlet 332 of the high pressure turbine 320. Based on a position of the bypass valve 314, the exhaust gas from the first subset of cylinders 310 may be directed upward and over the first passage 330 in the lateral direction and then back down to an exhaust passage 336 downstream of an exit 338 of the high pressure turbine 320. Exhaust which exits the high pressure turbine 320 flows under the first passage 330 and the second passage 317 in the lateral direction to an inlet 340 of the low pressure turbine 322.

Figure 9:
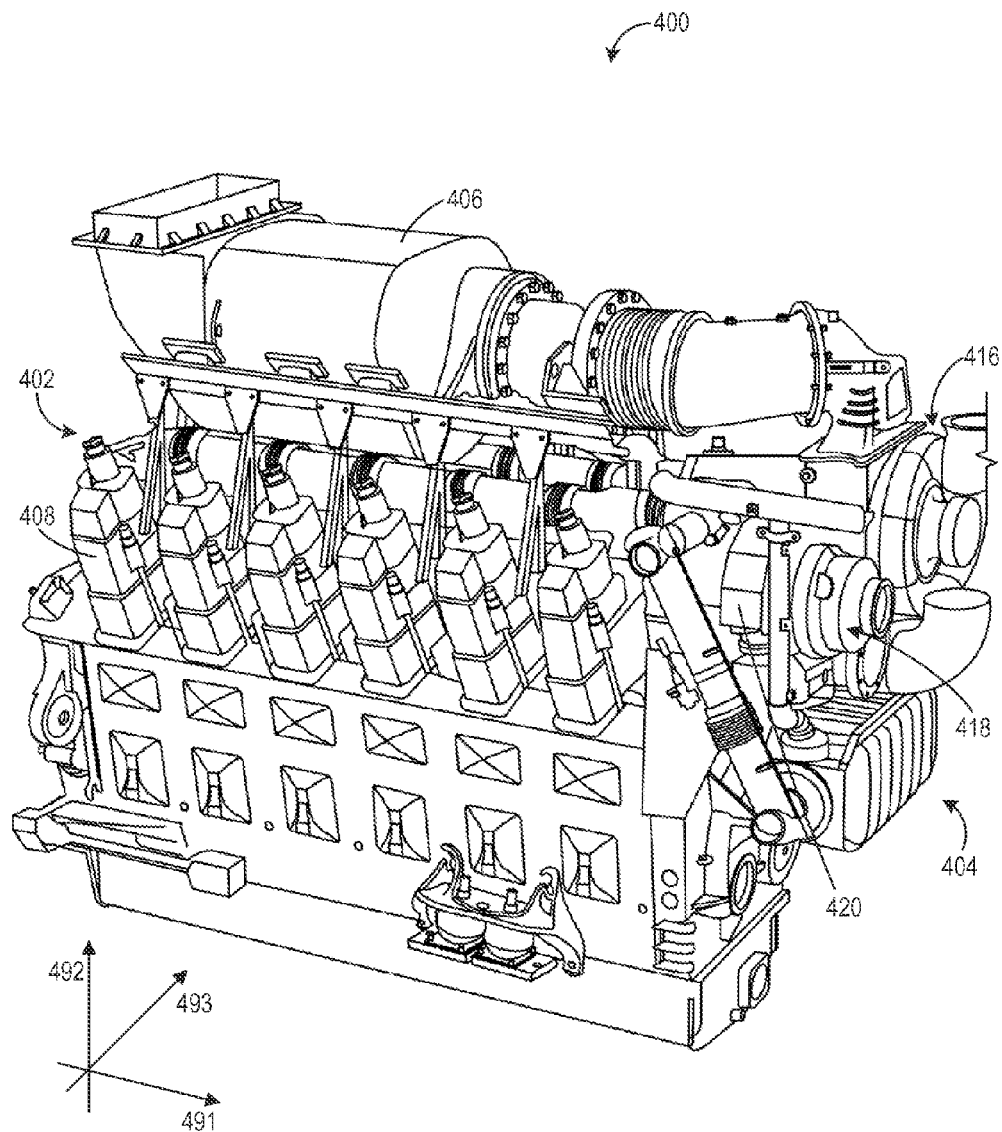
FIG. 9-12 show perspective views, approximately to scale, of an engine system in which exhaust is routed to downstream of a high pressure turbine from a first subset of cylinders.
Figure 10:
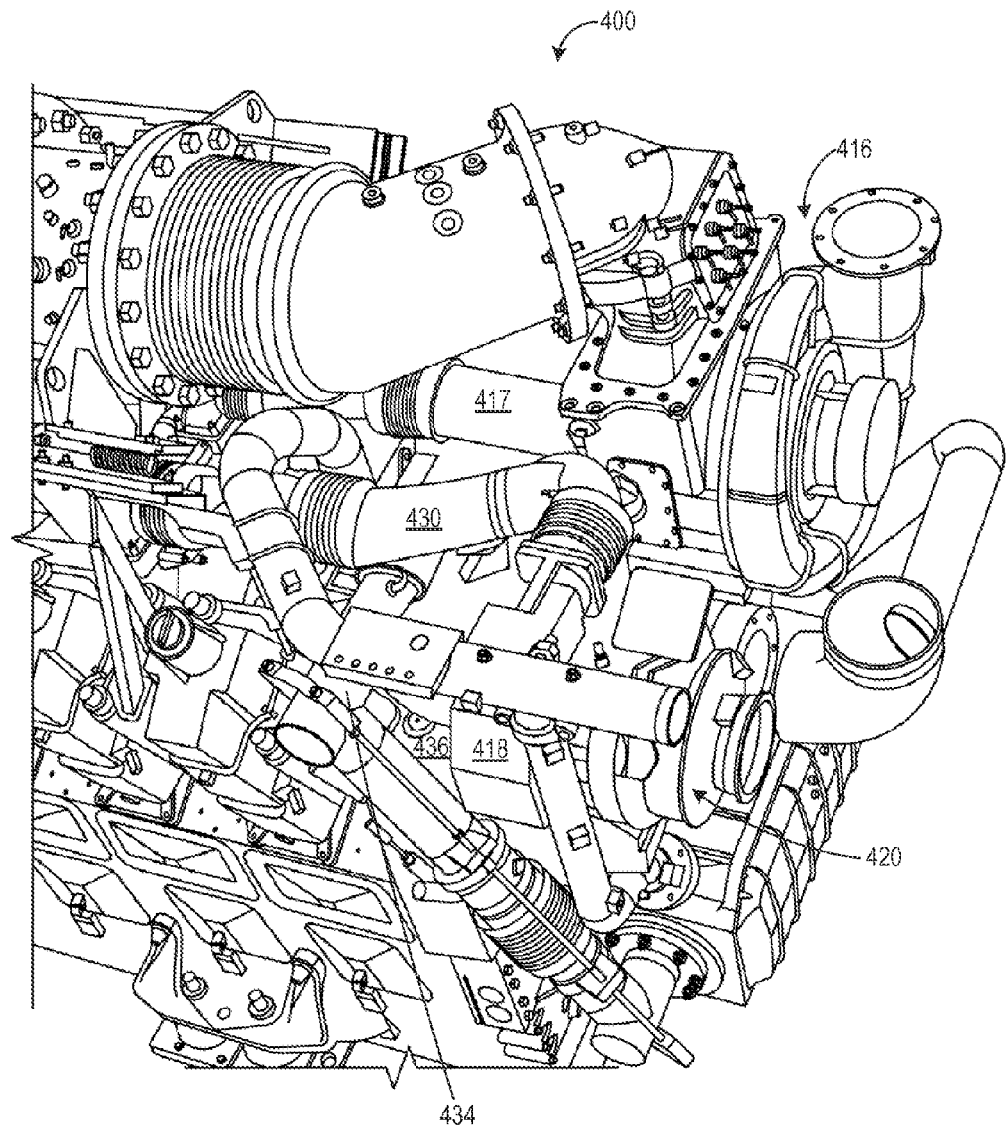
Figure 11:
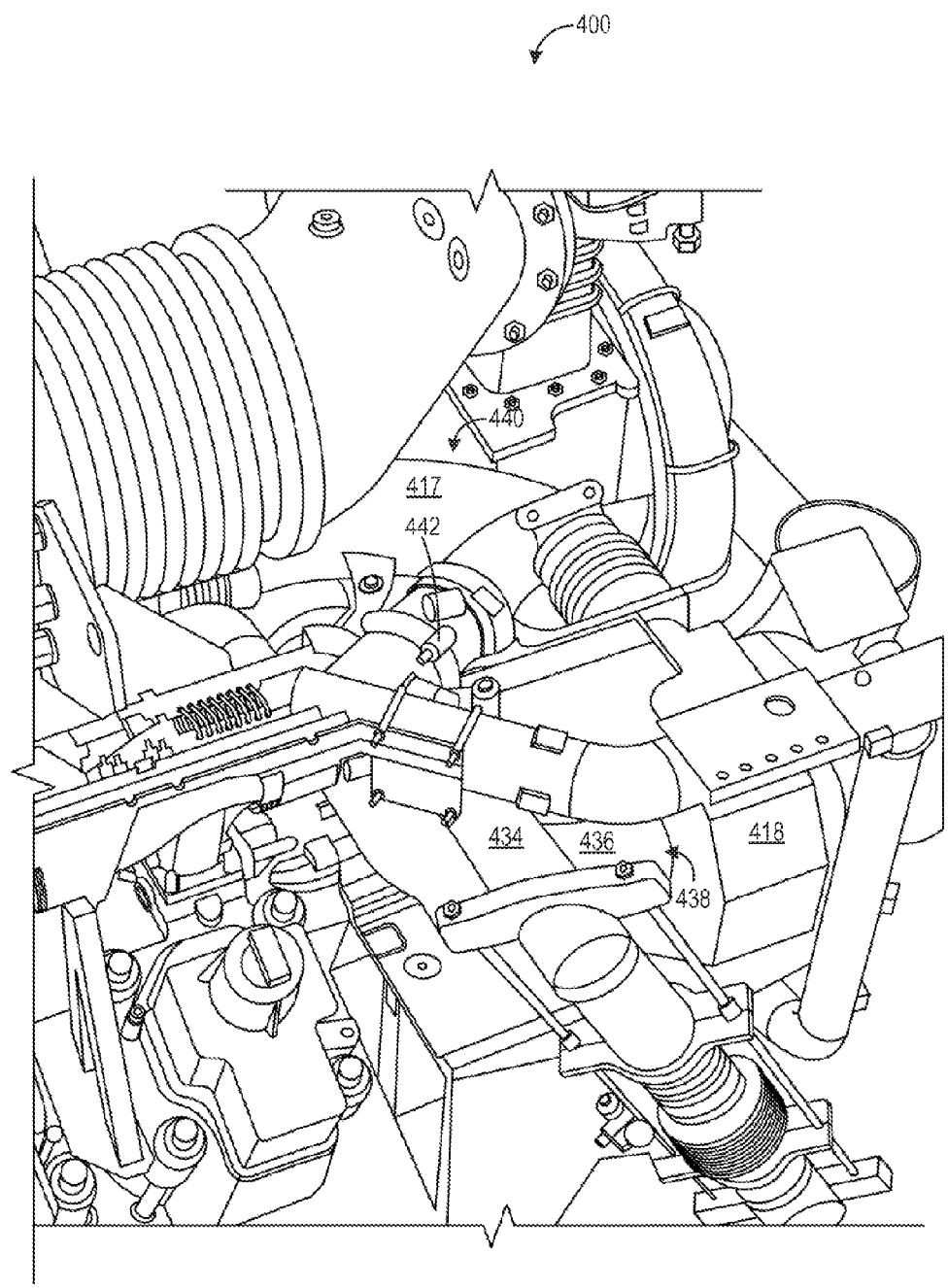
Figure 12:
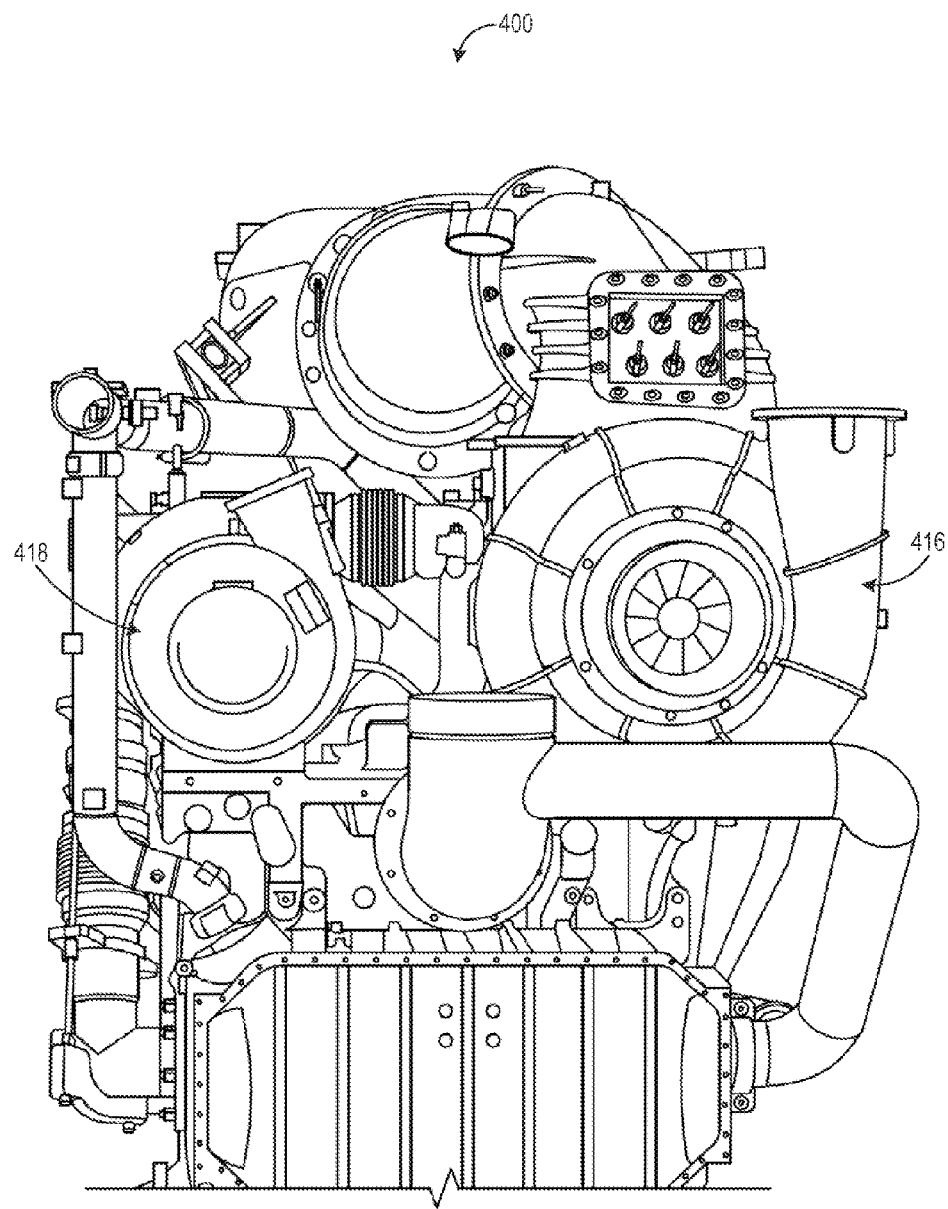

FIGS. 9-12 show perspective views of an engine system 400, such as the engine system 100 described above with reference to FIG. 1. The perspective views illustrated in FIGS. 9-12 are shown approximately to scale. FIGS. 9-12 show views of the engine system 400 in which exhaust gas from a first subset of cylinders 408 (e.g., donor cylinders) is not routed to upstream of a high pressure turbine 420. FIG. 9 shows a view of the engine system 400 including an engine 402, an exhaust system, and an aftertreatment system 406. In the view illustrated in FIG. 9, a front 404 of the engine 402 is facing toward a right side of the page and a first subset of cylinders 408 is shown.

As depicted, like the engine 302, the engine 402 is a V-engine which includes two banks of cylinders that are positioned at an angle of less than 180 degrees with respect to one another such that they have a V-shaped inboard region and appear as a V when viewed along a longitudinal axis of the engine. The longitudinal axis of the engine is defined by its longest dimension in this example. In the example of FIGS. 9-12, the longitudinal direction is indicated by 491, the vertical direction is indicated by 492, and the lateral direction is indicated by 493. The bank of cylinders 408 shown in FIG. 9 may be the first subset of cylinders 107 (e.g., donor cylinders) described above with reference to FIG. 1.

Each bank of cylinders includes a plurality of cylinders (e.g., six cylinders in FIGS. 9-12). Each of the plurality of cylinders includes an intake valve which is controlled by a camshaft to allow a flow of compressed intake air to enter the cylinder for combustion. In the examples shown in FIGS. 9-12, charge air enters an intake manifold flowing in the longitudinal direction from the front 404 of the engine 402 toward the back of the engine 402. Each of the cylinders further includes an exhaust valve which is controlled by the camshaft to allow a flow of combusted gases (e.g., exhaust gas) to exit the cylinder. In the examples of FIG. 9-12, the exhaust gas exits the cylinder, enters an exhaust manifold positioned within the V (e.g., in an inboard orientation), and then flows in the longitudinal direction to an exhaust system toward the front 404 of the engine. In other embodiments, the exhaust manifold may be in an outboard orientation, for example, in which the exhaust manifold is positioned outside of the V.

In the embodiment shown in FIGS. 9-12, an aftertreatment system 406 is positioned vertically above the engine 402. The aftertreatment system 406 is positioned on top of the engine 402 such that it fits within a space defined by a top surface of an exhaust manifold of the engine 402, a roof assembly of an engine cab (not shown), and side walls of the engine cab. As depicted in FIG. 9, a longitudinal axis of the aftertreatment system 406 is aligned in parallel with the longitudinal axis of the engine 402. This configuration provides for desirable space utilization, for example.

The engine system 400 further includes a low pressure turbocharger 416 and a high pressure turbocharger 418 mounted adjacent each other in the lateral direction on the front 404 of the engine 402. In the examples shown in FIGS. 9-12, exhaust from a second subset of cylinders (e.g., the bank of cylinders not visible in FIG. 9) enters a second exhaust passage 417, and only exhaust from the second subset of cylinders passes through the high pressure turbine 420 of the high pressure turbocharger 418. The second exhaust passage 417 may be the second passage 194 described above with reference to FIG. 1, for example. Exhaust from the first subset of cylinders 408 (e.g., the bank of cylinders shown in FIG. 9) may be routed around the high pressure turbine 420 to a location downstream of the high pressure turbine 420 and upstream of a low pressure turbine 422 and/or routed to an intake manifold (e.g., such as via the third passage 196 described above with reference to FIG. 1). As such, exhaust from the first subset of cylinders 408 does mix with exhaust from the second subset of cylinders (e.g., the bank of cylinders not visible in FIG. 9) upstream of the high pressure turbine 420.

In particular, exhaust flows from the first subset of cylinders 408 to a first passage 430. Based on a position of a flow control valve 442, exhaust from the first subset of cylinders 408 may flow to an exhaust passage 436 downstream of the high pressure turbine 420 and/or to an intake passage via an EGR passage 434 (e.g., the third passage 196 shown in FIG. 1). As such, the exhaust from the first subset of cylinders 408 does not mix with exhaust from the second subset of cylinders upstream of the high pressure turbine 420. In such an example, the exhaust from the first subset of cylinders 408 is routed directly to downstream of an outlet 438 of the high pressure turbine 420 without a bypass. Exhaust which exits the high pressure turbine 420 flows through the exhaust passage 436 under the first passage 430 and the second passage 417 in the lateral direction to an inlet 440 of the low pressure turbine 422.

Thus, in the example shown in FIGS. 9-12, packaging may be improved and design may be simplified. For example, without a high pressure turbine bypass and bypass valve, a size of the system is reduced. As another example, without a high pressure turbine bypass, a number of harness branches may be reduced. Further, without the bypass valve, control logic may be simplified and a number of parts may be reduced. For example, mapping of a position of the bypass valve with respect to engine speed and load, and/or other parameters is no longer necessary when there is no bypass valve. Oil supply and return lines for the valve are also eliminated when there is no bypass valve, thereby reducing a number of parts and control logic of the system. Further, as described above, by routing exhaust from the first subset of cylinders 408 to downstream of the high pressure turbine 420, turbulence and/or pressure pulsations on the high pressure turbocharger 418 and exhaust passages may be reduced. Pressure pulsation at the high pressure turbine 420 due to movement of the bypass valve may also be eliminated.

Figure 13:
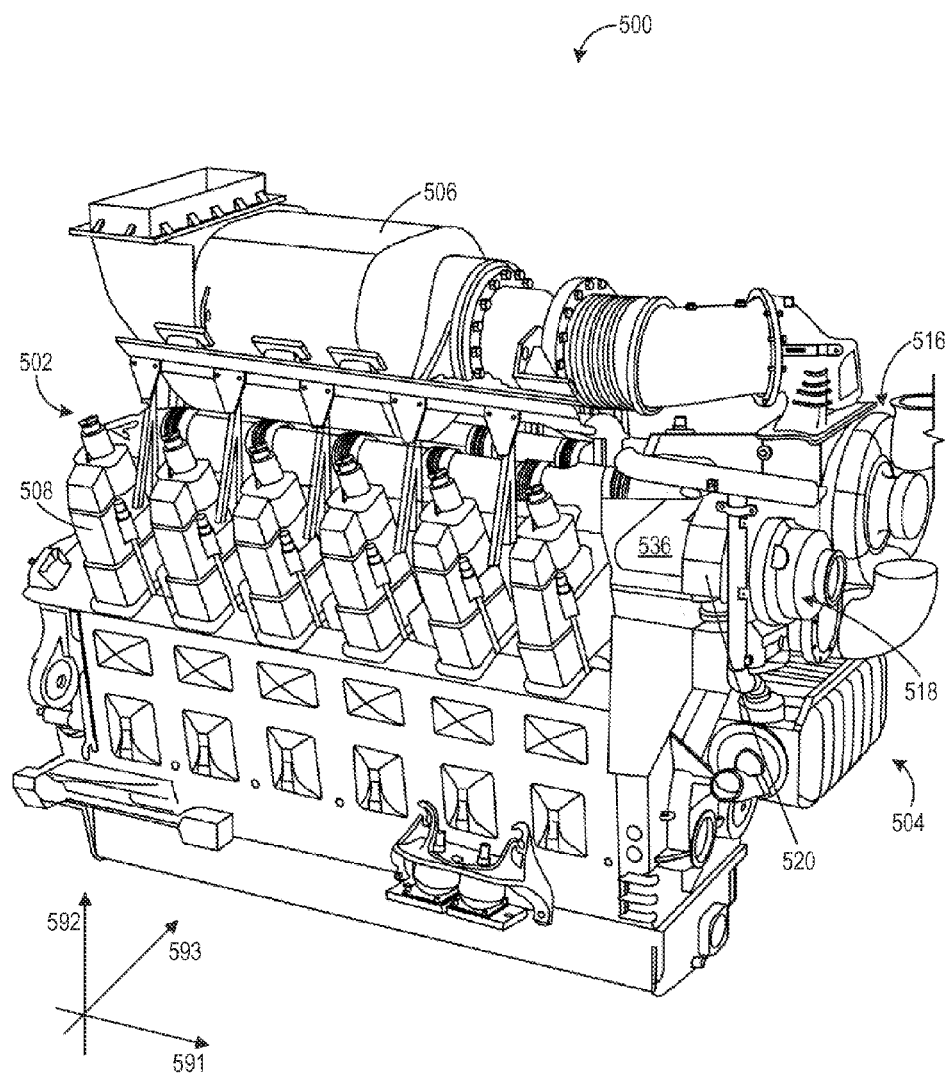
FIGS. 13-14 show perspective views, approximately to scale, of an engine system in which exhaust is routed downstream of a high pressure turbine from a first subset of cylinders.
Figure 14:
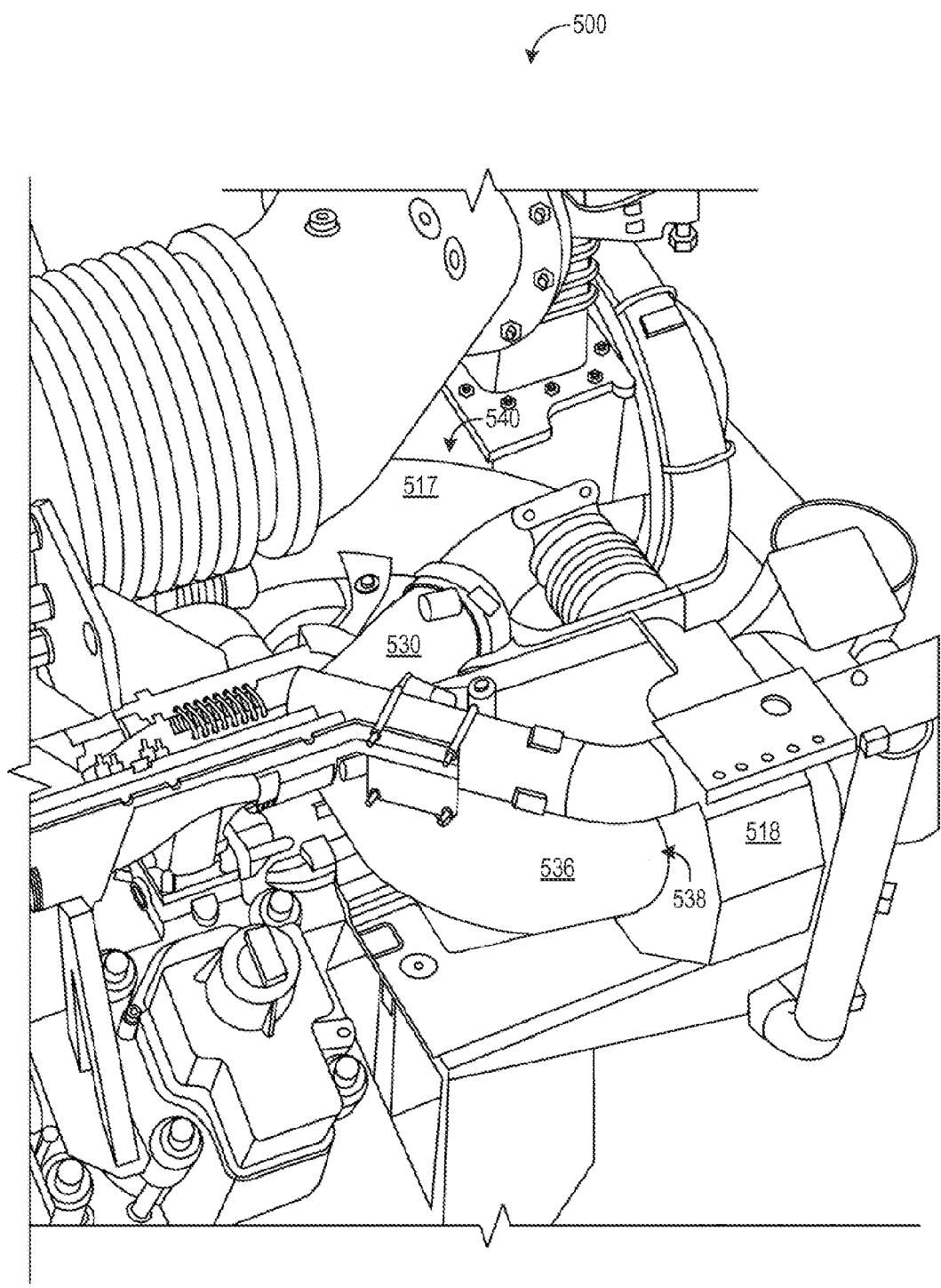

FIGS. 13-14 show perspective views of an engine system 500, such as the engine system 100 described above with reference to FIG. 1. The perspective views illustrated in FIGS. 13-14 are shown approximately to scale. FIGS. 13-14 show views of the engine system 500 in which exhaust gas from a first subset of cylinders 508 is not routed to upstream of a high pressure turbine 520. FIG. 13 shows a view of the engine system 500 including an engine 502, an exhaust system, and an aftertreatment system 506. In the view illustrated in FIG. 13, a front 504 of the engine 502 is facing toward a right side of the page and a first subset of cylinders 508 is shown.

As depicted, like the engines 302 and 402, the engine 502 is a V-engine which includes two banks of cylinders that are positioned at an angle of less than 180 degrees with respect to one another such that they have a V-shaped inboard region and appear as a V when viewed along a longitudinal axis of the engine. The longitudinal axis of the engine is defined by its longest dimension in this example. In the example of FIGS. 13-14, the longitudinal direction is indicated by 591, the vertical direction is indicated by 592, and the lateral direction is indicated by 593. The bank of cylinders 508 shown in FIG. 13 may be the first subset of cylinders 107 (e.g., donor cylinders) described above with reference to FIG. 1.

Each bank of cylinders includes a plurality of cylinders (e.g., six cylinders in FIGS. 13-14). Each of the plurality of cylinders includes an intake valve which is controlled by a camshaft to allow a flow of compressed intake air to enter the cylinder for combustion. In the examples shown in FIGS. 13-14, charge air enters an intake manifold flowing in the longitudinal direction from the front 504 of the engine 502 toward the back of the engine 502. Each of the cylinders further includes an exhaust valve which is controlled by the camshaft to allow a flow of combusted gases (e.g., exhaust gas) to exit the cylinder. In the examples of FIG. 13-14, the exhaust gas exits the cylinder, enters an exhaust manifold positioned within the V (e.g., in an inboard orientation), and then flows in the longitudinal direction to an exhaust system toward the front 404 of the engine. In other embodiments, the exhaust manifold may be in an outboard orientation, for example, in which the exhaust manifold is positioned outside of the V.

In the embodiment shown in FIGS. 13-14, an aftertreatment system 506 is positioned vertically above the engine 502. The aftertreatment system 506 is positioned on top of the engine 502 such that it fits within a space defined by a top surface of an exhaust manifold of the engine 502, a roof assembly of an engine cab (not shown), and side walls of the engine cab. As depicted in FIG. 13, a longitudinal axis of the aftertreatment system 506 is aligned in parallel with the longitudinal axis of the engine 502. This configuration provides for desirable space utilization, for example.

The engine system 500 further includes a low pressure turbocharger 516 and a high pressure turbocharger 518 mounted adjacent each other in the lateral direction on the front 504 of the engine 502. In the examples shown in FIGS. 13-14, exhaust from a second subset of cylinders (e.g., the bank of cylinders not visible in FIG. 13) enters a second exhaust passage 517, and only exhaust from the second subset of cylinders passes through the high pressure turbine 520 of the high pressure turbocharger 518. The second exhaust passage 517 may be the second passage 194 described above with reference to FIG. 1, for example. Exhaust from the first subset of cylinders 508 (e.g., the bank of cylinders shown in FIG. 13) may be routed around the high pressure turbine 520 to a location downstream of the high pressure turbine 520 and upstream of a low pressure turbine 522 and/or routed to an intake manifold (e.g., such as via the third passage 196 described above with reference to FIG. 1). As such, exhaust from the first subset of cylinders 508 does mix with exhaust from the second subset of cylinders (e.g., the bank of cylinders not visible in FIG. 13) upstream of the high pressure turbine 520.

In particular, exhaust flows from the first subset of cylinders 508 to a first passage 530. Exhaust from the first subset of cylinders 508 flows to an exhaust passage 536 downstream of the high pressure turbine 520. As such, the exhaust from the first subset of cylinders 508 does not mix with exhaust from the second subset of cylinders upstream of the high pressure turbine 520. In such an example, the exhaust from the first subset of cylinders 508 is routed directly to downstream of an outlet 538 of the high pressure turbine 520 without a bypass. Exhaust which exits the high pressure turbine 420 flows through the exhaust passage 536 under the first passage 530 and the second passage 517 in the lateral direction to an inlet 540 of the low pressure turbine 522.

Thus, in the example shown in FIGS. 13-14, packaging may be improved and design may be simplified. For example, without a high pressure turbine bypass, bypass valve, and flow control valve (e.g., the valve 442 shown in FIGS. 9-12), a size of the system is reduced. Further, without the bypass valve and flow control valve, control logic may be simplified and a number of parts may be reduced. For example, mapping of a position of the bypass valve and/or flow control valve with respect to engine speed and load, and/or other parameters is no longer necessary. Oil supply and return lines for the valves are also eliminated, thereby reducing a number of parts and control logic of the system.

Figure 15:
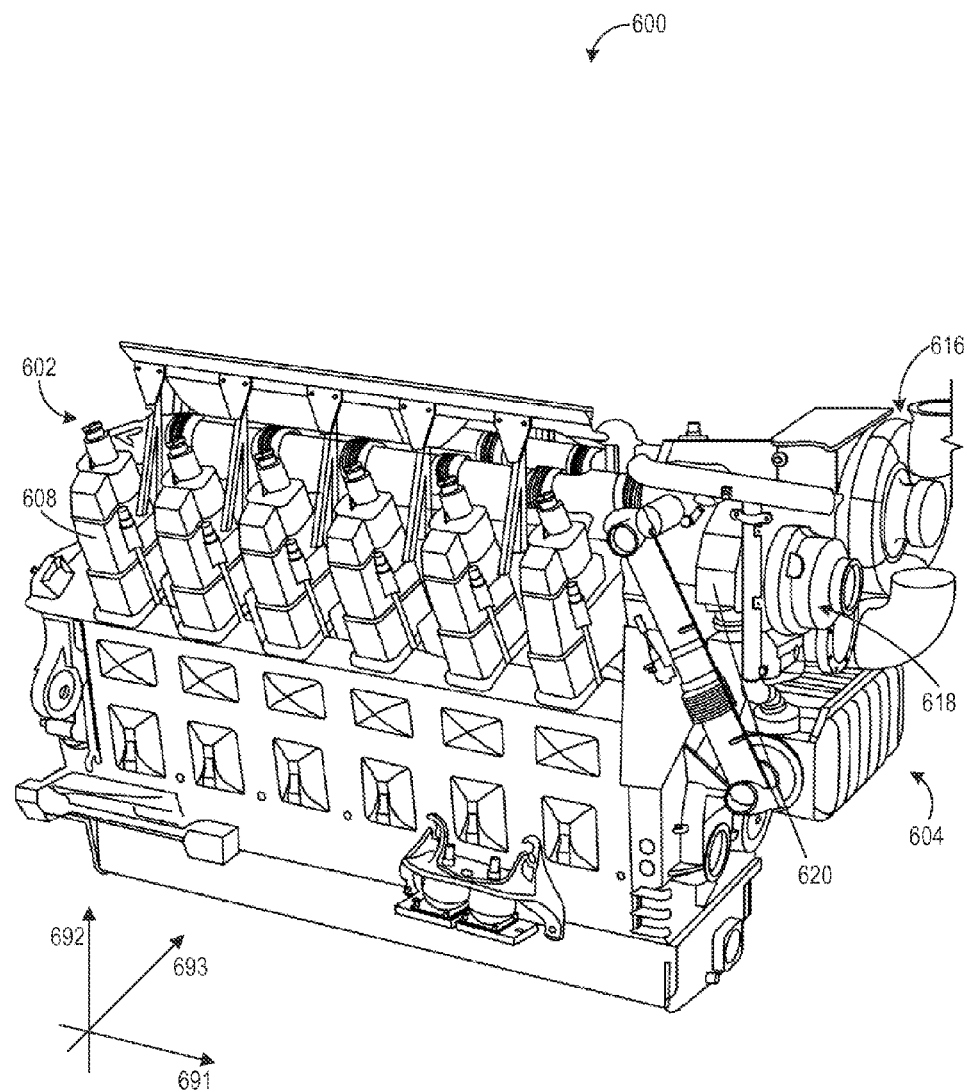
FIG. 15 shows a perspective view, approximately to scale, of an engine system in which exhaust is routed downstream of a high pressure turbine from a first subset of cylinders.

FIG. 15 shows a perspective view of an engine system 600, such as the engine system 100 described above with reference to FIG. 1. The perspective view illustrated in FIG. 15 is shown approximately to scale. FIG. 15 shows a view of the engine system 600 in which exhaust gas from a first subset of cylinders 608 (e.g., donor cylinders) is not routed to upstream of a high pressure turbine 620. FIG. 15 shows a view of the engine system 600 including an engine 602 and an exhaust system. In the view illustrated in FIG. 15, a front 604 of the engine 602 is facing toward a right side of the page and a first subset of cylinders 608 is shown.

As depicted, like the engines 302, 402, and 502, the engine 602 is a V-engine which includes two banks of cylinders that are positioned at an angle of less than 180 degrees with respect to one another such that they have a V-shaped inboard region and appear as a V when viewed along a longitudinal axis of the engine. The longitudinal axis of the engine is defined by its longest dimension in this example. In the example of FIG. 15, the longitudinal direction is indicated by 691, the vertical direction is indicated by 692, and the lateral direction is indicated by 693. The bank of cylinders 608 shown in FIG. 15 may be the first subset of cylinders 107 (e.g., donor cylinders) described above with reference to FIG. 1.

Each bank of cylinders includes a plurality of cylinders (e.g., six cylinders in FIG. 15). Each of the plurality of cylinders includes an intake valve which is controlled by a camshaft to allow a flow of compressed intake air to enter the cylinder for combustion. In the examples shown in FIG. 15, charge air enters an intake manifold flowing in the longitudinal direction from the front 604 of the engine 602 toward the back of the engine 602. Each of the cylinders further includes an exhaust valve which is controlled by the camshaft to allow a flow of combusted gases (e.g., exhaust gas) to exit the cylinder. In the examples of FIG. 15, the exhaust gas exits the cylinder, enters an exhaust manifold positioned within the V (e.g., in an inboard orientation), and then flows in the longitudinal direction to an exhaust system toward the front 604 of the engine. In other embodiments, the exhaust manifold may be in an outboard orientation, for example, in which the exhaust manifold is positioned outside of the V.

The engine system 600 further includes a low pressure turbocharger 616 and a high pressure turbocharger 618 mounted adjacent each other in the lateral direction on the front 604 of the engine 602. In the examples shown in FIG. 15, similar to the examples shown in FIGS. 9-12, exhaust from a second subset of cylinders (e.g., the bank of cylinders not visible in FIG. 15) enters a second exhaust passage, and only exhaust from the second subset of cylinders passes through the high pressure turbine 620 of the high pressure turbocharger 618. The second exhaust passage may be the second passage 194 described above with reference to FIG. 1, for example. Exhaust from the first subset of cylinders 608 (e.g., the bank of cylinders shown in FIG. 9) may be routed around the high pressure turbine 620 to a location downstream of the high pressure turbine 620 and upstream of a low pressure turbine and/or routed to an intake manifold (e.g., such as via the third passage 196 described above with reference to FIG. 1). As such, exhaust from the first subset of cylinders 608 does mix with exhaust from the second subset of cylinders (e.g., the bank of cylinders not visible in FIG. 9) upstream of the high pressure turbine 620.

As explained above, the terms "high pressure" and "low pressure" are relative, meaning that "high" pressure is a pressure higher than a "low" pressure. Conversely, a "low" pressure is a pressure lower than a "high" pressure.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a high pressure turbine;
   a low pressure turbine;
   a first passage for routing exhaust from a first subset of cylinders on a first cylinder bank, bypassing the high pressure turbine, to upstream of the low pressure turbine in an exhaust passage of an engine; and
   a second passage for routing exhaust from a second, different subset of cylinders on a second cylinder bank to upstream of the high pressure turbine, wherein only exhaust from the second subset of cylinders is routed to upstream of the high pressure turbine, wherein exhaust exiting the high pressure turbine flows through the exhaust passage to the low pressure turbine, the exhaust passage positioned under the first passage and the second passage in a lateral direction, and wherein exhaust from the first subset of cylinders is routed directly to downstream of an outlet of the high pressure turbine without passing through a bypass passage.

2. The system of claim 1, further comprising a third passage for routing exhaust from the first subset of cylinders to an intake passage.

3. The system of claim 2, wherein the third passage is positioned to route the exhaust from the first subset of cylinders to downstream of a high pressure compressor in the intake passage, the high pressure compressor mechanically coupled to the high pressure turbine via a shaft.

4. The system of claim 2, further comprising a first control element operable to control exhaust flow from the first subset of cylinders to the exhaust passage and a second control element operable to control exhaust flow from the first subset of cylinders to the intake passage.

5. The system of claim 4, further comprising a control system operable to vary positions of the first and second control elements based on a desired amount of exhaust gas recirculation.

6. The system of claim 5, wherein the control system is further configured to vary the positions of the first and second control elements based on a first pressure obtained in the intake passage and a second pressure obtained in the third passage.

7. A system, comprising:
   an engine having a plurality of cylinders;
   a high pressure turbine;
   a low pressure turbine fluidly coupled downstream from the high pressure turbine in an exhaust passage of the engine;
   a first passage for routing exhaust from a first subset of the plurality of cylinders on a first cylinder bank, bypassing the high pressure turbine, to upstream of the low pressure turbine;
   a second passage for routing exhaust from a second, different subset of the plurality of cylinders on a second cylinder bank to upstream of the high pressure turbine;
   a third passage for routing exhaust from the first subset of the plurality of cylinders to an intake passage of the engine;
   a first control element operable to adjust exhaust flow in the first passage; and
   a second control element operable to adjust exhaust flow in the third passage, where all the exhaust from the first subset of the plurality of cylinders is routed through the first passage, the third passage, or both the first passage and the third passage, and where exhaust from the first subset of the plurality of cylinders is routed directly to downstream of an outlet of the high pressure turbine without passing through a bypass passage.

8. A method, comprising:
   selectively routing exhaust from a first subset of engine cylinders of an engine to each of an intake passage and an exhaust passage that is downstream of a high pressure turbine and upstream of a low pressure turbine, and not to an exhaust passage that is upstream of the high pressure turbine;

varying an amount of the exhaust routed to the exhaust passage;

varying an amount of the exhaust routed to the intake passage; and routing all exhaust from a second, different subset of engine cylinders of the engine to upstream of the high pressure turbine, where when combusted exhaust is produced in the first subset of engine cylinders and the second subset of engine cylinders, only exhaust from the second subset of engine cylinders is routed to upstream of the high pressure turbine such that in all modes of operation, only exhaust from the second subset of engine cylinders is routed to upstream of the high pressure turbine and none of the exhaust from the first subset of engine cylinders that is routed downstream of the engine is routed to upstream of the high pressure turbine.

9. The method of claim 8, further comprising routing all exhaust from the first subset of cylinders to each of the exhaust passage and the intake passage.

10. The method of claim 8, wherein varying the amount of the exhaust routed to the exhaust passage includes adjusting a first control element, and wherein varying the amount of the exhaust routed to the intake passage includes adjusting a second control element.

11. The method of claim 8, further comprising obtaining first information of a first pressure downstream of an aftercooler and upstream of an exhaust gas recirculation mixer in the intake passage, and obtaining second information of a second pressure downstream of an exhaust gas recirculation cooler and upstream of the exhaust gas recirculation mixer in an exhaust gas recirculation passage.

12. The method of claim 11, further comprising varying the amount of the exhaust routed to the exhaust passage and varying the amount of the exhaust routed to the intake passage based on the first information and the second information.

13. A system, comprising:
a high pressure turbine;
a low pressure turbine;
a first control element operable to route exhaust from a first subset of cylinders of an engine to a location downstream of the high pressure turbine and upstream of the low pressure turbine in an exhaust passage of the engine; and
a second control element operable to route exhaust from the first subset of cylinders to an intake passage of the engine, where all exhaust from the first subset of cylinders is routed to the exhaust passage downstream of the high pressure turbine, to the intake passage, or both, and where when combusted exhaust is produced in the first subset of cylinders and a second subset of cylinders, only exhaust from the second subset of cylinders is routed to upstream of the high pressure turbine such that in all modes of operation of the system, only exhaust from the second subset of cylinders is routed to upstream of the high pressure turbine and none of the exhaust from the first subset of cylinders that is routed downstream of the engine is routed to upstream of the high pressure turbine.

14. The system of claim 13, further comprising a first pressure sensor disposed downstream of an aftercooler and upstream of an exhaust gas recirculation mixer in the intake passage and a second pressure sensor disposed downstream of an exhaust gas recirculation cooler and upstream of the exhaust gas recirculation mixer in an exhaust gas recirculation passage.

15. The system of claim 14, further comprising a control system configured to obtain a first pressure from the first pressure sensor and a second pressure from the second pressure sensor, and to control positions of the first and second control elements to selectively route portions of the exhaust to one or more of the intake passage and the exhaust passage based on the first and second pressures.

16. The system of claim 13, wherein cylinders of the first subset of cylinders are donor cylinders.

17. The system of claim 13, further comprising a first passage for routing exhaust from the first subset of cylinders, bypassing the high pressure turbine, to upstream of the low pressure turbine in the exhaust passage of the engine.

18. The system of claim 13, further comprising a second passage for routing all exhaust from the second, different subset of cylinders to upstream of the high pressure turbine.

19. The system of claim 13, further comprising a third passage for routing exhaust from the first subset of cylinders to the intake passage of the engine.

20. A system, comprising:
a high pressure turbine;
a low pressure turbine;
a first passage for routing exhaust from a first subset of cylinders of an engine, bypassing the high pressure turbine, to upstream of the low pressure turbine in an exhaust passage of the engine; and
a second passage for routing exhaust from a second subset of cylinders of the engine to upstream of the high pressure turbine, wherein the cylinders of the first subset are different from the cylinders of the second subset, and wherein in all modes of operation of the system only exhaust from the second subset of cylinders is routed to upstream of the high pressure turbine and none of the exhaust from the first subset of cylinders that is routed downstream of the engine is routed to upstream of the high pressure turbine.

* * * * *